(12) United States Patent
Kim

(10) Patent No.: US 7,142,816 B2
(45) Date of Patent: Nov. 28, 2006

(54) REMOTE CONTROL KEY FOR A VEHICLE

(75) Inventor: Sin Gu Kim, Ulsan (KR)

(73) Assignee: Hyundai Motor Company, Seoul (KR)

( * ) Notice: Subject to any disclaimer, the term of this patent is extended or adjusted under 35 U.S.C. 154(b) by 444 days.

(21) Appl. No.: 10/751,019

(22) Filed: Dec. 31, 2003

(65) Prior Publication Data
US 2005/0088332 A1    Apr. 28, 2005

(30) Foreign Application Priority Data
Oct. 10, 2003   (KR) ...................... 10-2003-0070618

(51) Int. Cl.
H04B 7/00    (2006.01)
H04B 1/02    (2006.01)
H04B 1/34    (2006.01)

(52) U.S. Cl. .................. 455/41.2; 455/91; 455/128

(58) Field of Classification Search .............. 455/41.1, 455/41.2, 91, 128, 129, 95; 341/173, 176; 340/5.6, 5.61, 5.64, 825.69, 825.72
See application file for complete search history.

(56) References Cited

U.S. PATENT DOCUMENTS

| | | | | |
|---|---|---|---|---|
| 4,998,952 A | * | 3/1991 | Hyatt et al. ............... 70/395 |
| 5,331,325 A | * | 7/1994 | Miller ........................ 341/176 |
| 5,438,312 A | * | 8/1995 | Lewis ........................ 340/457 |
| 5,592,169 A | * | 1/1997 | Nakamura et al. .......... 341/173 |
| 5,819,568 A | * | 10/1998 | Christie et al. ............... 70/395 |
| 6,473,022 B1 | * | 10/2002 | Wu ............................. 341/176 |
| 6,850,148 B1 | * | 2/2005 | Masudaya ................... 340/5.61 |
| 2002/0163768 A1 | * | 11/2002 | Kwon et al. .................. 361/56 |

FOREIGN PATENT DOCUMENTS

| | | |
|---|---|---|
| JP | 08-193444 | 7/1996 |
| KR | 1020020028290 A | 4/2002 |
| KR | 1020020037762 | 5/2002 |

* cited by examiner

*Primary Examiner*—Sonny Trinh
(74) *Attorney, Agent, or Firm*—Morgan Lewis & Bockius LLP

(57) ABSTRACT

The wave strength of a remote control key of a vehicle can be enhanced by forming the remote control key including a gripping portion, a metallic blade portion projecting from the gripping portion, and a transmitter contained in the gripping portion and electrically connected to the metallic blade portion.

8 Claims, 2 Drawing Sheets

REMOTE CONTROL KEY FOR A VEHICLE

CROSS-REFERENCE TO RELATED APPLICATIONS

This application claims priority of Korean Application No. 10-2003-0070618, filed on Oct. 10, 2003, the disclosure of which is incorporated fully herein by reference.

FIELD OF THE INVENTION

The present invention relates generally to a key for a vehicle, and more specifically, to a remote control key for a vehicle.

BACKGROUND OF THE INVENTION

Recently, vehicle keys including a transmitter for remotely locking and unlocking the doors of the vehicle have increased in popularity.

The vehicle keys may generally include a gripping portion and a key plate portion, in which case, the transmitter may comprise a printed circuit board (PCB) contained in the gripping portion of the key. An antenna for transmitting electromagnetic waves produced by the transmitter usually comprises either a printed pattern on the PCB, or a wire antenna contained in the gripping portion.

According to this type of prior art design, the antenna may be limited in size by the shape and dimensions of the gripping portion, consequently limiting the wave strength transmitted from the antenna. In addition, when the antenna is contained in the gripping portion, at least a part of the wave strength generated at the antenna may be blocked by the surrounding gripping portion.

SUMMARY OF THE INVENTION

An exemplary remote control key for a vehicle according to an embodiment of the present invention includes a gripping portion, a metallic blade portion projecting from the gripping portion, and a transmitter contained in the gripping portion and electrically connected to the metallic blade portion.

In a further embodiment, an exemplary remote control key further includes a switch for activating the transmitter, wherein, under an operation of the switch, the transmitter transmits an electromagnetic signal through the metallic blade portion.

The transmitter preferably includes a transmitter module for sending an electric signal to the metallic blade portion, and a static electricity shielding circuit disposed between the metallic blade portion and the transmitter module for shielding transmission of static electricity from the metallic blade portion to the transmitter module.

The static electricity shielding circuit preferably includes a pair of diodes, wherein the pair of diodes are reversely connected in parallel.

The transmitter is preferably connected to the metallic blade portion by a connecting electrode, and the connecting electrode is welded or soldered to the metallic blade portion.

It is also preferable that the transmitter is connected to the metallic blade portion by a connecting electrode in such a manner that the connecting electrode includes a metallic ring, a raised lip is formed at the metallic blade portion, and the metallic ring of the connecting electrode is engaged with and pressed to the raised lip.

BRIEF DESCRIPTION OF THE DRAWINGS

The accompanying drawings, which are incorporated in and constitute a part of the specification, illustrate an embodiment of the invention, and, together with the description, serve to explain the principles of the invention, wherein.

DETAILED DESCRIPTION OF THE PREFERRED EMBODIMENTS

An illustrative embodiment of the present invention will hereinafter be described in detail with reference to the accompanying drawings.

Figure 1:
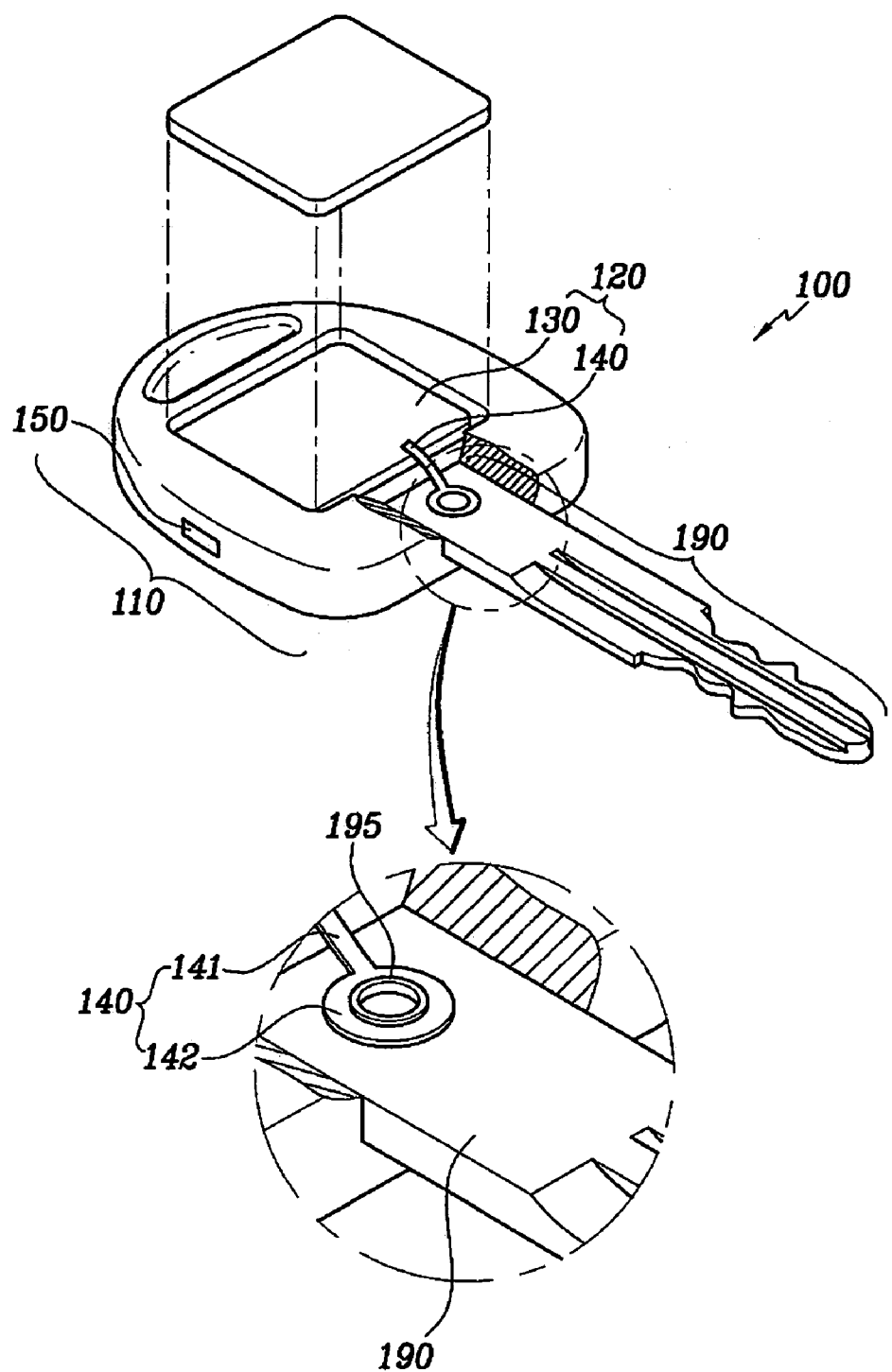
FIG. 1 is a perspective view of a remote control key for a vehicle according to an illustrative embodiment of the present invention, with portions shown in cross-section.

As shown in FIG. 1, a remote control key 100 for a vehicle according to an embodiment of the present invention includes a gripping portion 110 and a metallic blade portion 190 projecting from the gripping portion 110. The metallic blade portion 190 is a key plate portion that may be inserted into a lock (not shown) of a vehicle door and used, for example, to lock and unlock the door.

A transmitter 120 is located in the gripping portion 110, and is electrically connected to the metallic blade portion 190. The transmitter 120 may be made in the form of a printed circuit board (PCB) 130.

A connecting electrode 140 extends from the PCB 130 and is connected to the metallic blade portion 190 such that the transmitter 120 and the metallic blade portion 190 are electrically interconnected. The connection between the connecting electrode 140 and the metallic blade portion 190 may be implemented, for example, by welding, soldering, or other techniques known to one of ordinary skill in the art. Alternatively, the connecting electrode 140 may include a connecting line 141 having a metallic ring 142 formed at an end thereof, and the blade portion 190 may include a raised lip 195 that may engage and retain the metallic ring 142 (for example, the metallic ring 142 may be pressed onto the raised lip).

Still referring to FIG. 1, the remote control key 100 may further include a switch 150 for activating the transmitter 120. The transmitter 120 may detect an operation of the switch 150, and consequently, transmit an electromagnetic signal through the metallic blade portion 190. That is, when the switch 150 is operated, the transmitter 120 may send out a predetermined wave signal through the metallic blade portion 190.

Figure 2:
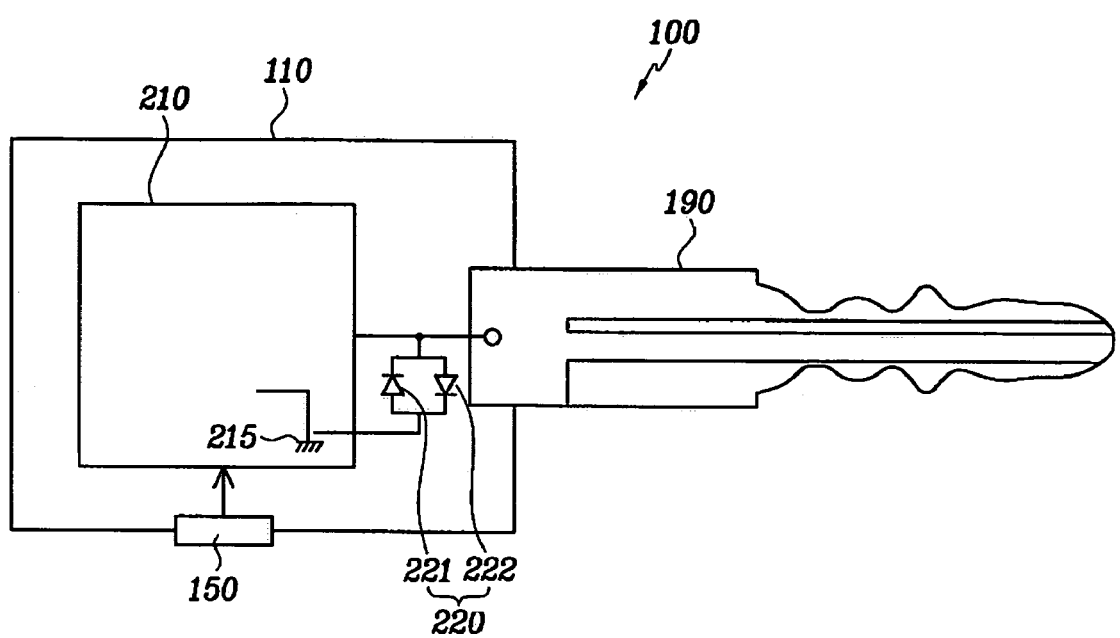
FIG. 2 is a circuit diagram of a remote control key for a vehicle according to an illustrative embodiment of the present invention.

A circuit diagram of a remote control key 100 according to an illustrative embodiment of the present invention will now be described in detail with reference to FIG. 2. As shown in FIG. 2, the transmitter 120 includes a transmitter module 210 for sending an electrical signal to the metallic blade portion 190, and a static electricity shielding circuit 220 disposed between the metallic blade portion 190 and the transmitter module 210. The static electricity shielding circuit 220 shields transmission of static electricity from the metallic blade portion 190 to the transmitter module 210.

The above-described function of the transmitter 120 is accomplished by the transmitter module 210, the detailed structures and functions of which are known by a person having ordinary skill in the art. The transmitter module 210 includes a ground electrode 215.

Diodes 221 and 222 are disposed in parallel between the metallic blade portion 190 and the ground electrode 215, and interconnect them. Directions of the diodes 221 and 222 are opposite to each other.

According to the present invention, the key plate or blade portion may serve as the wave transmitting antenna, resulting in increased wave strength, and consequently increasing the distance the signal transmitted by the remote control key 100 can reach. For example, a conventional remote control key (e.g., having an antenna contained in the gripping portion 110 as a PCB pattern or a wire antenna) may have a transmission range of about 10 m, while a remote control key according to an embodiment of the present invention may have a transmission range of about 15 m.

In addition, with an embodiment of the present invention, the circuit of the transmitter module is protected by the static electricity shielding circuit 220 in the event of an electrostatic discharge occurring between the remote control key and another object (e.g., a door frame of a vehicle). Therefore, even after a strong electrostatic discharge has occurred at the metallic blade portion 190, the wave strength of the remote control key is maintained. Such a protective effect can be confirmed by an electrostatic discharge (ESD) test.

The following Table 1 shows the result of an ESD test of a remote control key constructed according to an embodiment of the present invention without a static electricity shielding circuit 220. Table 2 shows the result of an ESD test of a remote control key according to a different embodiment of the present invention provided with a static electricity shielding circuit 220.

A unit decibel milliwatt (dBm) in the following Tables 1 and 2 denotes an absolute power level referenced to 1 mW, which is a term well known to a person of ordinary skill in the art.

TABLE 1

ESD test result for a remote control key according to an embodiment of the present invention without a static electricity shielding circuit 220

| Discharged voltage | Signal level after test | Discharged voltage | Signal level after test |
|---|---|---|---|
| 0 (Before test) | −22.13 dBm | 0 (Before test) | −23.69 dBm |
| +10.0 kV | −22.53 dBm | −10.0 kV | |
| +15.0 kV | −22.11 dBm | −15.0 kV | |
| +17.5 kV | −23.72 dBm | −17.5 kV | −26.39 dBm |
| +20.0 kV | −34.17 dBm | −20.0 kV | −44.22 dBm |
| +22.5 kV | −51.36 dBm | −22.5 kV | −55.17 dBm |
| +25.0 kV | −57.11 dBm | −25.0 kV | −58.03 dBm |
| +27.5 kV | −58.44 dBm | −27.5 kV | −58.33 dBm |
| +30.0 kV | −58.61 dBm | −30.0 kV | −58.61 dBm |

TABLE 2

ESD test result for a remote control key according to an embodiment of the present invention provided with a static electricity shielding circuit 220

| Discharged voltage | Signal level after test | Discharged voltage | Signal level after test |
|---|---|---|---|
| 0 (Before test) | −25.06 dBm | 0 (Before test) | −25.44 dBm |
| +15.0 kV | −25.31 dBm | −15.0 kV | −26.06 dBm |
| +17.5 kV | −25.31 dBm | −17.5 kV | −26.81 dBm |
| +20.0 kV | −25.75 dBm | −20.0 kV | −26.44 dBm |
| +22.5 kV | −26.14 dBm | −22.5 kV | −26.42 dBm |
| +25.0 kV | −25.64 dBm | −25.0 kV | −26.44 dBm |
| +27.5 kV | −25.64 dBm | −27.5 kV | −26.56 dBm |
| +30.0 kV | −26.14 dBm | −30.0 kV | −25.33 dBm |

As can be seen from the above Table 1, in the case where the remote control key is not provided with a static electricity shielding circuit 220, the output signal level of the key is steeply deteriorated when an electrostatic discharge of more than 20.0 kV is applied to the key plate portion, for example, because of damage in the circuit of the transmitter module. However, as can be seen from the above Table 2, in the case where the remote control key is provided with a static electricity shielding circuit 220, the transmitter module circuit is protected against an electrostatic discharge of 30 kV such that normal operation of the remote control key is preserved after such a high electrostatic discharge.

While this invention has been described in connection with what is presently considered to be the most practical and preferred embodiment, it should be understood that the invention is not limited to the disclosed embodiments, but rather, is intended to cover various modifications and equivalent arrangements included within the spirit and scope of the appended claims.

What is claimed is:

1. A remote control key for a vehicle comprising:
   a gripping portion;
   a metallic blade portion projecting from the gripping portion; and
   a transmitter contained in the gripping portion and electrically connected to the metallic blade portion, wherein the transmitter comprises:
      a transmitter module for sending an electric signal to the metallic blade portion; and
      a static electricity shielding circuit disposed between the metallic blade portion and the transmitter module for shielding transmission of static electricity from the metallic blade portion to the transmitter module.

2. The remote control key of claim 1, further comprising a switch for activating the transmitter, wherein when the switch is activated, the transmitter transmits an electromagnetic signal through the metallic blade portion.

3. The remote control key of claim 2, wherein the static electricity shielding circuit comprises a pair of diodes and the pair of diodes are reversely connected in parallel.

4. The remote control key of claim 2, wherein the transmitter is connected to the metallic blade portion by a connecting electrode, and the connecting electrode is welded or soldered to the metallic blade portion.

5. The remote control key of claim 2, wherein the transmitter is connected to the metallic blade portion by a connecting electrode;
   the connecting electrode comprises a metallic ring;
   a raised lip is formed at the metallic blade portion; and
   the metallic ring is engaged on the raised lip.

6. The remote control key of claim 1, wherein the static electricity shielding circuit comprises a pair of diodes, and the pair of diodes are reversely connected in parallel.

7. The remote control key of claim 1, wherein the transmitter is connected to the metallic blade portion by a connecting electrode, and the connecting electrode is welded or soldered to the metallic blade portion.

8. The remote control key of claim 1, wherein:
   the transmitter is connected to the metallic blade portion by a connecting electrode;
   the connecting electrode comprises a metallic ring;
   a raised lip is formed at the metallic blade portion; and
   the metallic ring is engaged on the raised lip.

* * * * *